July 16, 1968     R. W. MILER     3,393,260
PROCESS FOR PREPARING FOAM PRODUCTS
Original Filed July 2, 1962     2 Sheets-Sheet 1
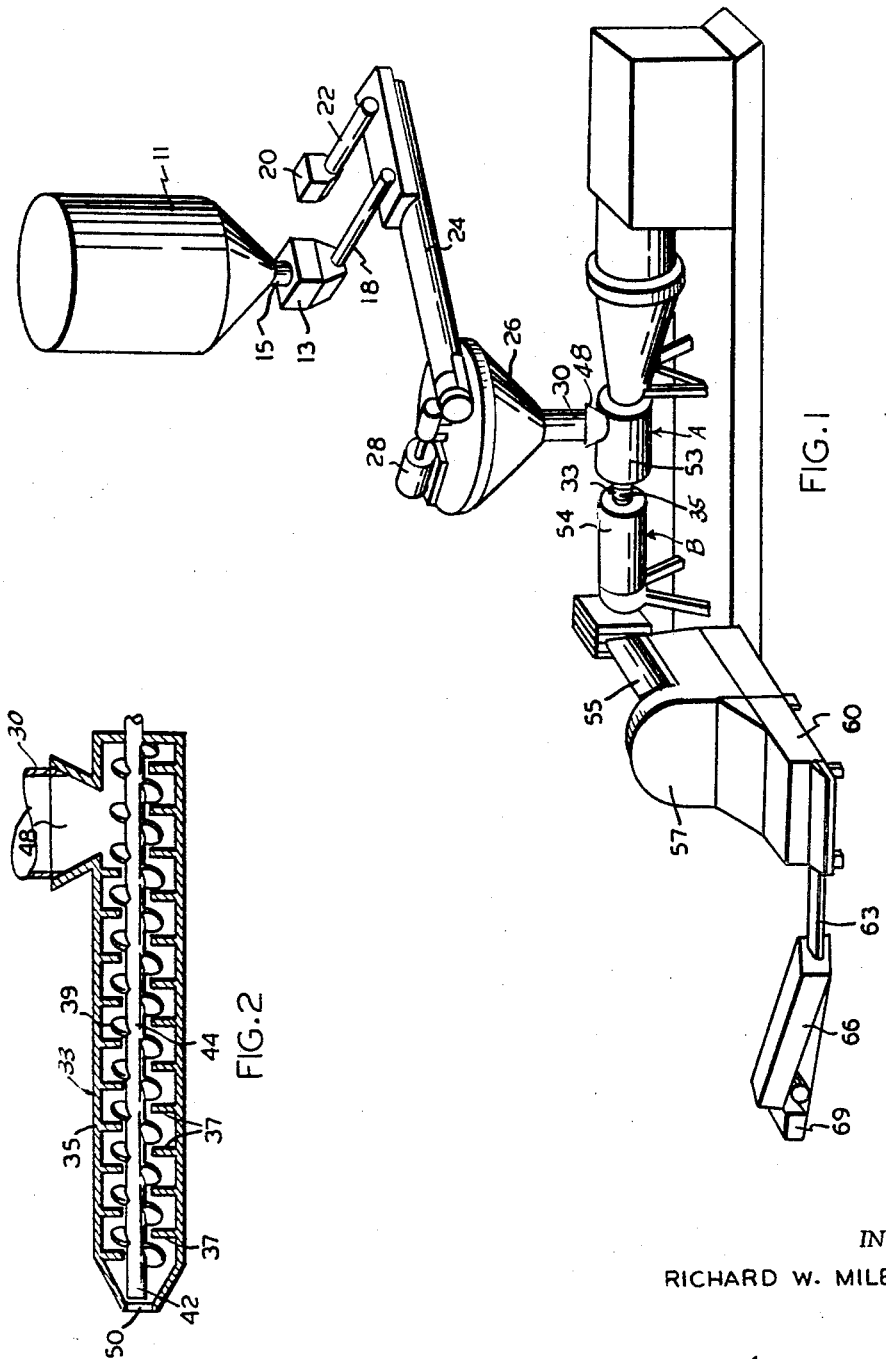
INVENTOR
RICHARD W. MILER
ATTORNEYS

3,393,260
PROCESS FOR PREPARING FOAM PRODUCTS
Richard W. Miler, Saginaw, Mich., assignor to Baker Perkins Inc., Saginaw, Mich., a corporation of New York
Continuation of application Ser. No. 206,854, July 2, 1962. This application Apr. 27, 1965, Ser. No. 453,883
6 Claims. (Cl. 264—54)

This application is a continuation of application Ser. No. 206,854, filed July 2, 1962, and now abandoned.

The invention relates to a novel process for mixing thermoplastic, resinous material, additives as desired, and foaming agent and is particularly concerned with the preparation of a thermoplastic, resinous, foaming agent mixture suitable for extrusion, injection molding, low pressure molding, etc., into desired products. These products include (a) extruded shaped, e.g., pelletized, thermoplastic material containing foaming agent, in a dormant state, substantially uniformly dispersed therein which, when heated, for instance in a mold or die, will foam or expand to produce a foamed product of desired configuration with substantially uniform cellular units and (b) extruded foamed thermoplastic materials of desired configuration.

Foamed thermoplastic resins are becoming increasingly popular for such uses as panels, e.g., refrigerator insulating panels, insulated panels of odd shapes and sandwich panels; articles including containers, e.g., flower pots and insulated drinking cups; clothing, e.g., survival suits and inner soles for shoes; buoyant objects such as boats, floats and life preservers; resilient objects such as cushions and pillows; and for industrial and military packaging.

Ordinarily, thermoplastic resins are supplied to the fabricator for shaping by heat and pressure to the desired final form without need for extensive knowledge of chemical technology on the part of the fabricator. Foamed products, on the other hand, have usually required more skill to produce because of the blending factors involved. This situation, of course, puts foamed products at a competitive disadvantage and increases their price to the consumer.

An object of the present invention is the provision of a process for extruding pellets of thermoplastic resinous material containing foaming agent in a dormant state which can be processed economically and expeditiously into desired shapes. Another object of the present invention is the provision of a process for making dense pellets comprising a substantially homogeneous mixture of thermoplastic resin and foaming agent. These pellets may be handled and shipped easily and eliminate the need for the foamed plastic fabricator to perform the frequently expensive and difficult blending step in his own shop.

Another object of this invention is the provision of a method for processing a wide number of additives, e.g., coloring, blending, compounding, stabilizing additives, and rubber, into the thermoplastic resinous material simultaneously with the incorporation of the foaming agent into the material. Still another object is the provision of a process for the production of particles which can be foamed into shapes at a later time as well as the production of foamed shapes as an integral part of the process.

In accordance with the process of the present invention, which can be conducted in continuous or batch operations, a compacted mixture of thermoplastic resin and foaming agent is intensively mixed and blended in a mixing zone to produce a homogeneous mixture at a temperature higher than the softening temperature of the resin, below the activation temperature of the foaming agent or at a pressure higher than a pressure which allows the foaming agent to produce gas, the mixture is then cooled, and finally the homogeneous mixture is extruded. The pressure and the rapid cooling upon the release of mechanically applied pressure is sufficient to discourage or eliminate, by means of the law of mass action, the tendency of the foaming agent to expand the gas within the product. The mixing zone employs an interrupted screw-type continuous mixer which serves to convey the particle mixture from a compacting zone, through the mixing zone to an extrusion zone.

The extrusion may be conducted with a low-pressure zone downstream of an extrusion die to give foamed extruded products, or the pressure downstream of the extrusion die may be elevated to produce pellets which are foamable at a later time, the technique employed being dependent on the activation temperature of the expanding agent. Preferably such pellets are rapidly cooled as soon as they are cut from the die. The particle mixture may contain, besides the resin and foaming agent, pigments, fillers, plasticzers, rubber, etc., to provide pellets which need no further blending with any material by the fabricator.

A wide range of thermoplastic materials, foaming agents and other additives may be employed in the process. Suitable organic plastic materials include the styrene and vinyl resins, e.g., polymers of lower alkenes, such as polyethylene, polypropylene, and polyvinyl chloride-urethane, for instance. At present polystyrene, and urethane foams are enjoying the greatest commercial acceptance, however, polypropylene is the newest plastic to enter the field.

The foaming agent or agents are in particle form at the time of introduction to the plastic material. There are many foaming or expansion agents that can be used, such as azodicarbonamide, azobisisobutyronitrile, benzene sulfonylhydrazide, diazoaminobenzene, N–N' dimethyl terephthalamide, N–N' dinitrose terephthalamide, 4–4' diphenyldisulfonylazide, 4–4' oxybis (benzene-sulfonylhydrazide), and sodium borohydride. Mixtures of these materials may also be employed. The foaming agents which are preferable depend on the desired end result. If the material is to be pelletized and contain part or all of the expansion agent non-expanded, then an expanding agent requiring a relatively high temperature for activation or operation is preferred. If it is desirable to expand the material directly out of the die, then an expanding agent with a low operating temperature is desirable. The amounts of foaming or expanding agents to be used in the process depend on the effectiveness of the expanding agent and the product density desired. A typical formulation is 90% polypropylene and 10% Kempore 60 (azodicarbonamide).

Optional additives can be of a considerable variety. The end use of the product determines the optional additives. For colored materials, all types of pigments, oil dyes, carbon black, etc., can be used. Reinforcing of the base material may be accomplished with rubber or other high molecular weight material such as Fiberglas and sisal fiber. Stabilizing material and plasticizers may also be used. Generally the foaming agent and other additives will be added as dry materials, but liquid additives may also be employed prior to or during the mixing stage, the resin particles becoming coated with the liquid before the compaction phase of the process. Advantageously, the particle size of both resin and solid additives is about the same.

The invention will be better understood by reference to the accompanying drawing, in which:

FIGURE 1 represents a schematic diagram of an apparatus which can be used to perform the process;

FIGURE 2 is a cross-sectional, schematic view of the mixing or kneading part of this apparatus to illustrate the intensive mixing action which takes place in the mixing zone;

Figure 3:
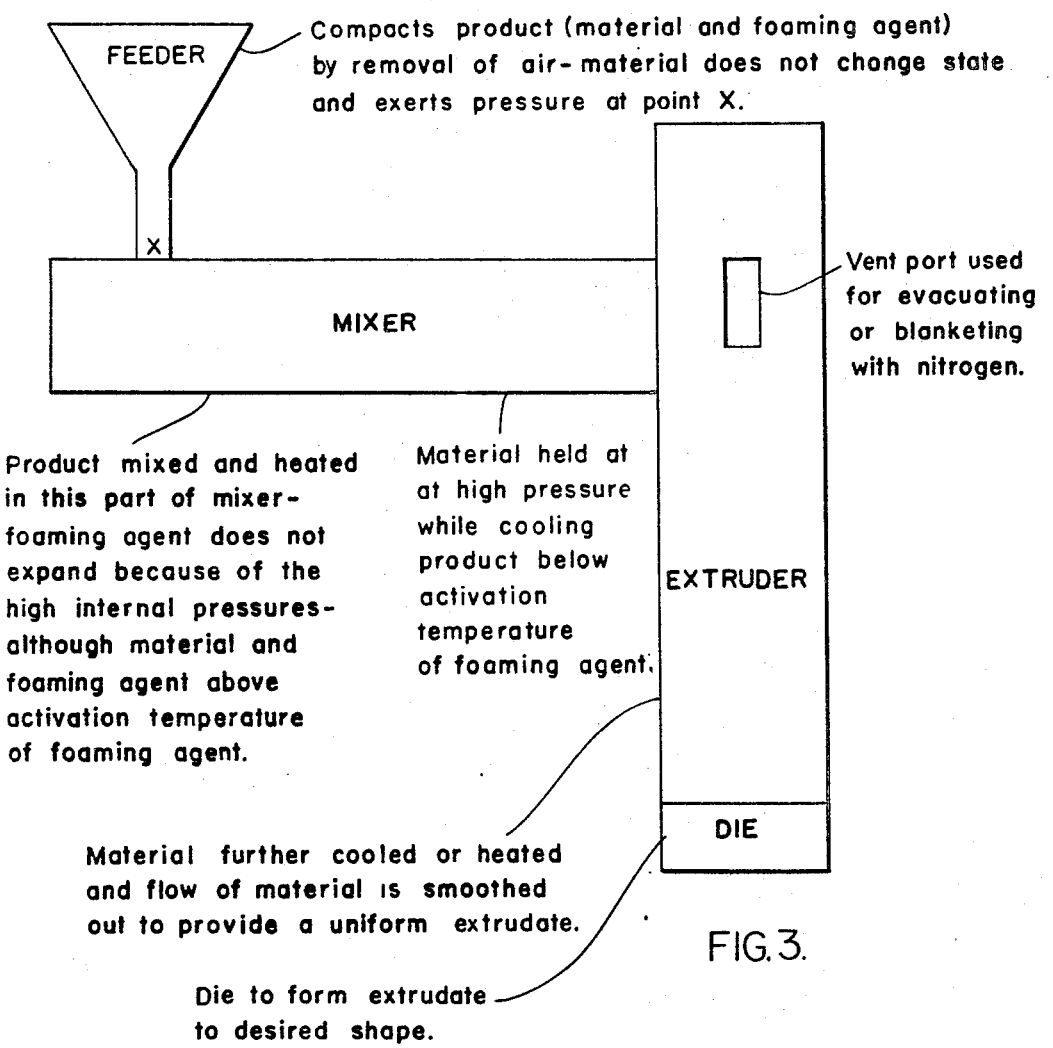
FIGURE 3 is a schematic representation additionally illustrating certain parts of the system.

In the drawings, 11 represents a feeder hopper in which thermoplastic resin in a particle size, e.g., ranging from pellets (3/32″ diameter x 3/32″ in length) to powder, is disposed. This material passes to feeder 13 by means of the funnel 15 and is conducted through the passage 18, preferably by means of a proportioning screw conveyor or weigh feeding device. Foaming agent is conducted by feeder 20 in through the passage 22, containing a proportioning screw conveyor or weigh feeding device. These passages lead to the continuous blender and conveyor 24 which may be provided also with feeders for other additives in solid particulate states. The materials in the conveyor 24 are dry blended and delivered into the power feeder 26 which is provided with the motor 28. The power feeder 26 contains a screw which compacts the blended material downwardly through the tube 30 into the kneader 33.

The kneader or blender 33 is preferably one in which an interrupted screw is both rotated and reciprocated. As shown more clearly in FIGURE 2, the kneader comprises a barrel 35 which is made of a strong, pressurizable material having attached to it internally a series of kneading teeth 37. A kneading screw 39, around the axle 42, is provided with interrupted flights containing gaps 44, which allow reciprocation of the screw portion between each pair of teeth with reciprocal motion of only a portion of the material in the barrel. Rotation of the axle and screw causes forward movement of the material in the barrel from the entry part 48 to the exit 50. The barrel is equipped for both heating and cooling, containing two zones A and B (see FIGURE 1). Also, the screw 39 is preferably tubular substantialy throughout its length and heating or cooling medium may be circulated therein. Usually the temperature of the coolant for the screw corresponds to the zone B temperature. A heating means 53 is generally provided around the barrel in zone A, at least around its leading portion. The heating means may be a steam coil in an insulating jacket, an electric heater, etc., or the barrel may be in the range of a radiant heater, such as an infrared ray discharge device. A cooling means 54 can be employed, when desired, in zone B located near the discharge end.

The exit 50 of the blender 33 leads to the extruder barrel passage 55 of a conventional extruder which is provided at its trailing edge with the extruding die and cutting chamber 57. Preferably, this chamber is at atmospheric pressure. The cutter chamber can contain an extrusion die and advantageously a rotating knife blade. See, for instance, United States Patent No. 2,614,290. The die shapes the finished product and the blade cuts the materials into pellets of uniform size. These pellets are flung at high velocities into the trough 60 which contains a cooling fluid and the exposure to air and fluid substantially instantaneously chill the material below the softening temperature of the thermoplastic. Conveyors 63 and 66 may bring the pellets to the packaging station 69. In conveyor 66 a screening operation may be performed to separate out the cooling fluid.

The system can be totally enclosed, blanketed with an inert gas and operated from a remote position, particularly when employing foaming agents which can be combustible and possibly even explosive.

The purpose of the pre-mixing step preformed in conveyor 24 is to blend the ingredients together in a non-melted state to evenly proportion the products together prior to entry into the kneader. Preferably, this preblending is performed at room temperature, below the melt temperature of the resin and at atmospheric pressure. After preblending, the products are well proportioned and may be at a higher temperature but not melted.

In the compaction phase, the bulk density of the particle mixture is increased, a constant flow of material to the kneader is maintained and the material can be preheated before it is softened or melted in the kneader. The compaction phase advantageously removes air from between the individual particles by exerting pressure on the mass of material. The ranges of preferable conditions for the compaction step differ with different materials. Compaction is accomplished basically by screw design, speed, and pressure. For one typical operation a 4″ diameter, 2″ pitch x 14″ length screw was used. It operated from 12 to 91 r.p.m. and compacted the product about 2 to 1. The nature of the mixture at this point is still a powder or granular form, not melted, but it may be warm. It may have increased in bulk density approximately 2 to 4 times what it was originally.

As noted supra, the rotation and reciprocation of the screw in the kneader subjects the mixture to mechanical shearing due to interaction of the screw, screw flights, barrel and teeth. Along with the temperature control, this causes intensive blending of all the ingredients into a homogeneous, softened or melted mass. Preferred conditions provide quick melting of the resin as soon as possible after it enters the blending zone, with gradual cooling to just above the softening temperature by the time the exit from the blender is reached. The first portion of the kneader, near the compaction zone, may be held in a temperature range generally of about 350–500° F. with the exit end held at about 200–250° F., depending upon the materials in processing. The speed of rotation and reciprocation of the screw will depend on the amount of output desired and the final product temperature. The product of this phase is a melted or at least softened mass of homogeneous material which has increased to the density, e.g., 52–60 lb./cu. ft., of the finished product. It is discharged to extruder 55 in a pulsating manner due to the reciprocating motion of the kneader screw. These mixing means are particularly advantageous in that they intensively blend the components of the mixture under minimum temperature conditions.

The final shaping is done in the extruder 55 which picks up the pulsating discharge from the kneader and forces the product smoothly through a die. The die may be of any size or shape. Pellets, e.g., macrosize particles, which have the general dimensions of 1/8″ diameter by 1/8″ length, for instance, are suitable for further processing. The die is usually provided with many holes. It is preferable to operate the extruder at conditions which do not add excessive amounts of heat to the product, generally at temperatures from about 250° to 350° F. The die should be maintained at temperatures higher than the melting temperature of the material to prevent the die from becoming blocked by cold material. The cutting of pellets can be accomplished by use of a fly knife cutter. The knife slices the pellets in the desired length and throws them into a cooling fluid bath with such a rate of speed to avoid activating the foaming agent, i.e., the foaming agent does not have time to foam or expand.

The cooling fluid may be, for example, a water bath. The water should be cold enough to form a skin of solid material around the pellet. The water temperature can advantageously be about 100° F. or lower to quickly chill the material. The pellets should be in the water for a sufficient period of time to cool the material enough to avoid activation of the foaming agent such that it would expand after the pellets are removed from the water. For polypropylene this temperature is advantageously about 190° F. The pelletized product produced can be cylindrical, 1/8″ diameter by 1/8″ long, although it could be of other similar dimensions such as 1/16″ diameter by 1/16″ long, 1/8″ diameter by 1/16″ long, etc. These shapes are easily fed and melt quickly in the machinery which will produce the final product.

Where boards or other foamed shapes are to be directly extruded, temperatures on the exit side of the die are employed to sufficiently heat the mixture to the activation temperature of the foaming agent and pressure can be reduced to allow foaming to occur. In such a situation a slotted die may be used, for instance, to allow the material to expand on discharge from the die in order for shapes, e.g., insulating boards of 1", 2", 3" deep by 8", 10", 12", etc., to be made. When such materials are produced, the cutting can be done by a saw, hot wire, etc. Cooling is not permitted to occur until all the expansion has taken place. Then air or water cooling can be accomplished to remove the heat so the product will retain its shape.

The density range of extruded foamed product or of the foamed products made from the extruded pellets will depend on the required strength of the final product and its use. Generally, two lbs. per cu. ft. material is desirable for products such as Christmas decorations. Sandwich panels will require material of a much higher density, possibly 15 to 18 lbs. per cu. ft. Densities higher than these are sometimes used when greater strength is required.

Example

Foamable polypropylene resin pellets were manufactured as follows employing a Model UP-100 kneader of Baker Perkins Inc., Saginaw, Mich. Commercially obtained polypropylene resin was granulated and fed to the premixing zone. For each 100 parts by weight of resin 1.5 parts of pure titanium dioxide pigment, 1/10 part of skyline blue pigment, 1/2 part of amine plasticizer and one part of azobicarbromide (Kempore 60) foaming agent were also fed to the pre-mixing zone. This particle mixture was conducted to a compacting stage where the mixture was compressed to about half its volume and sent to the blender at a pressure of about 2100 p.s.i. and a temperature of about 290° F. The leading portion of the blender was at a temperature of about 335° F., which was sufficient to melt the polypropylene resin, and the latter portion of the blending zone was at a temperature of about 265° F. The blender screw revolved at 40 r.p.m. and reciprocated at 40 reciprocations/min. The homogeneous plastic mass was conducted to an extruder die held at 2100 p.s.i. and about 400° F. The die had 31 holes of 0.06 inch in diameter. A flying blade revolving at 2200 r.p.m. cut the extrudate into pellets which fell into a water bath having a temperature of about 70° F. Hard, evenly colored, foamable polypropylene pellets were produced.

The process of this invention is of advantage in that it may be continuous, may incorporate many materials into the thermoplastic resin, and can produce pellets for foaming or finished extruded foam products.

It is important to understand that the screw conveyors in passages 18 and 22 are each operated by separate motors, that the kneader shaft 44 is operated by a separate motor, and that the extruding screw conveyor in passage 55 is operated by still another motor. This permits each stage to operate independently (i.e., at different speeds and temperatures) to obtain optimum conditions in each phase and obtain the desired control of the final product.

It is to be understood that the drawings and descriptive matter are in all cases to be interpreted as merely illustrative of the principles of the invention rather than as limiting the invention in any way, since it is contemplated that various changes may be made in the various elements to achieve like results without departing from the spirit of the invention or the scope of the appended claims.

I claim:
1. A process for molding a thermoplastic resin and a foaming agent into a desired shape comprising the steps of: compacting a mixture of particles of said resin and particles of said foaming agent to increase the bulk density thereof and remove the gas from between the particles of resin and agent at a temperature below the softening temperature of the resin immediately; thereafter introducing said mixture under feeding pressure to a mixing and kneading zone and intensively mixing and kneading the resin and agent by moving portions thereof forwardly and rearwardly with respect to other portions at a temperature higher than the softening temperature of the resin and under temperature and pressure conditions maintaining the foaming agent inactive to produce a homogeneous mixture; and then extruding the softened mixture.

2. The process of claim 1 in which the softened mixture is extruded to a zone at a temperature sufficient to cause foaming of said resin.

3. A process as defined in claim 1 wherein said compacting increases the bulk density of the mixture from about 2 to 4 times its original.

4. The process of claim 1, wherein said resin is polypropylene resin.

5. The process of claim 1 wherein said foaming agent is azodicarbonamide.

6. The process of claim 1 in which the softened mixture is cooled prior to extruding it to a temperature below the activation temperature of the foaming agent.

References Cited

UNITED STATES PATENTS

| | | | |
|---|---|---|---|
| 2,614,290 | 10/1952 | Street | 25—109 |
| 2,674,396 | 4/1954 | Peterson. | |
| 2,933,175 | 4/1960 | Gray. | |
| 3,017,371 | 1/1962 | Hohenberg et al. | 260—2.5 |
| 3,072,972 | 1/1963 | Yokose et al. | 264—47 |
| 3,121,911 | 2/1964 | Lightner | 264—95 X |
| 3,141,002 | 7/1964 | Hill | 260—2.5 |
| 3,222,437 | 12/1965 | Schilling | 264—54 |
| 2,262,989 | 11/1941 | Conklin et al. | |
| 2,731,247 | 1/1956 | Hudry. | |
| 2,901,774 | 9/1959 | Pooley | 264—55 |
| 2,964,799 | 12/1960 | Roggi et al. | 264—54 X |
| 3,003,193 | 10/1961 | Chisholm et al. | 264—54 X |
| 3,011,217 | 12/1961 | Carlson | 264—53 |
| 3,026,272 | 3/1962 | Rubens et al. | 264—53 X |
| 3,026,273 | 3/1962 | Engles | 264—53 X |
| 3,065,502 | 11/1962 | Lorenian | 18—12 |
| 3,183,553 | 5/1965 | Slater | 18—12 |
| 3,193,601 | 7/1965 | Billingsley | 18—12 X |

FOREIGN PATENTS

| | | |
|---|---|---|
| 829,912 | 3/1960 | Great Britain. |
| 849,935 | 9/1960 | Great Britain. |

JAMES A. SEIDLECK, Primary Examiner.

ALEXANDER H. BRODMERKEL, DONALD J. ARNOLD, Examiners.

P. E. ANDERSON, Assistant Examiner.